May 1, 1973  C. R. LANG ET AL  3,730,691

MULTIPLE BED CATALYTIC CONVERTER

Filed April 26, 1971

INVENTORS
CHARLES R. LANG
DONALD N. SCHOCK
BY
John R. Faulkner
Glenn S. Arendsen
ATTORNEYS

United States Patent Office 3,730,691
Patented May 1, 1973

3,730,691
MULTIPLE BED CATALYTIC CONVERTER
Charles R. Lang, Dearborn, and Donald N. Schock, Flat Rock, Mich., assignors to Ford Motor Company, Dearborn, Mich.
Filed Apr. 26, 1971, Ser. No. 137,350
Int. Cl. F01n 3/14; B01j 9/04
U.S. Cl. 23—288 F                    14 Claims

ABSTRACT OF THE DISCLOSURE

Exhaust gases are supplied to the central portion of a cylindrical housing and pass axially through a first catalytic bed that reduces oxides of nitrogen. The gases then flow radially outward in spaces defined by the side walls of the cylindrical housing and finally pass axially inward through a second catalytic bed that oxidizes unburned hydrocarbons and carbon monoxide. Supplemental air is supplied in a manner that promotes good mixing and minimizes backflow.

SUMMARY OF THE INVENTION

Recent legislative emission standards for automotive vehicles necessitate considerable reductions in the quantities of undesirable components and efforts to comply with these standards have proceeded on several fronts, one of which has been the development of catalytic converters. Effective catalytic conversion requires not only the chemical reduction of oxides of nitrogen found in the exhaust gases but also the chemical oxidation of other exhaust gas components such as unburned or partially burned hydrocarbons or carbon monoxide.

This invention provides a multiple bed catalytic converter that includes a plurality of catalysts within a single compact housing. For automotive purposes, the first catalyst typically is a reducing catalyst for reducing oxides of nitrogen and the second catalyst typically is an oxidizing catalyst for oxidizing unburned hydrocarbons and carbon monoxide. The converter maximizes the flow area of both catalyst beds with overall package size and inherently provides a higher and more uniform operating temperature for the reducing catalyst bed. Structural components of the converter comprise an outer housing having a distributing housing located in its central portion. An exhaust gas inlet connects with the distributing housing and an exhaust gas outlet is formed in the outer housing. A reducing catalyst is located adjacent the distributing housing where incoming exhaust gases flow initially through the reducing catalyst. The bed of the reducing catalyst extends toward the outer housing but is separated therefrom by a narrow open space. An oxidizing catalyst connects the narrow space with the exhaust gas outlet. Appropriate tubes supply air or some other oxygen containing material to the narrow space for use in the oxidizing reactions.

The outer housing preferably has a substantially cylindrical shape that is closed at both ends by circular end walls and the distributing housing then is a smaller cylindrical shape spaced in the central portion of the outer housing. Flanges extend axially outward on both sides of the inner housing but terminate short of the end walls of the outer housing to leave radial flow spaces adjacent those end walls. Cylindrical or disc shaped reducing catalyst beds are positioned radially inside the flanges and toroidal oxidizing catalyst beds are positioned radially outside of the flanges. Exhaust gases enter the distributing housing, flow axially outward therefrom through the reducing beds, pass radially through the end spaces where supplemental air mixes therewith, flow axially inward through the oxidizing beds and finally pass out of the exhaust gas outlet.

Supplemental air preferably enters the end spaces through small openings located approximately at the radial levels of the flanges. The openings face radially outward at least partially so the flow of supplemental air has a radially outward component as it enters the end spaces. This radially outward component is parallel to the flow of exhaust gases at the point where the supplemental air enters the end spaces. Backflow is minimized and mixing of the supplemental air and the exhaust gases is improved by this arrangement.

DETAILED DESCRIPTION

Figure 1:
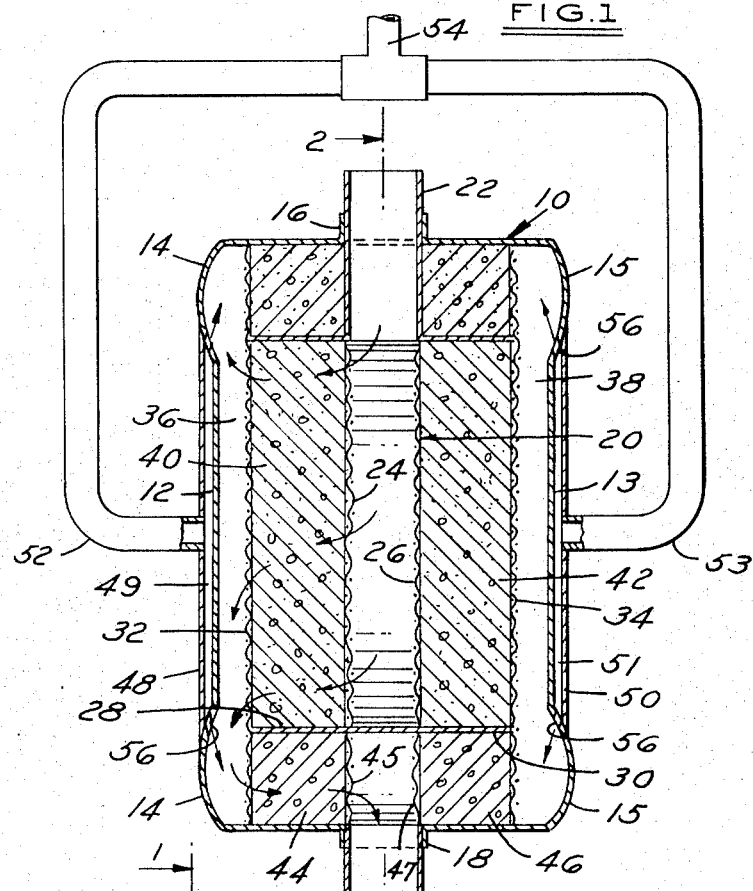
FIG. 1 is a sectioned elevation of a catalytic converter of this invention having a substantially cylindrical outer housing. The figure shows the axially projecting flanges of the inner housing, the gas flow spaces adjacent each side wall of the outer housing, and the secondary air supply system.
Figure 2:
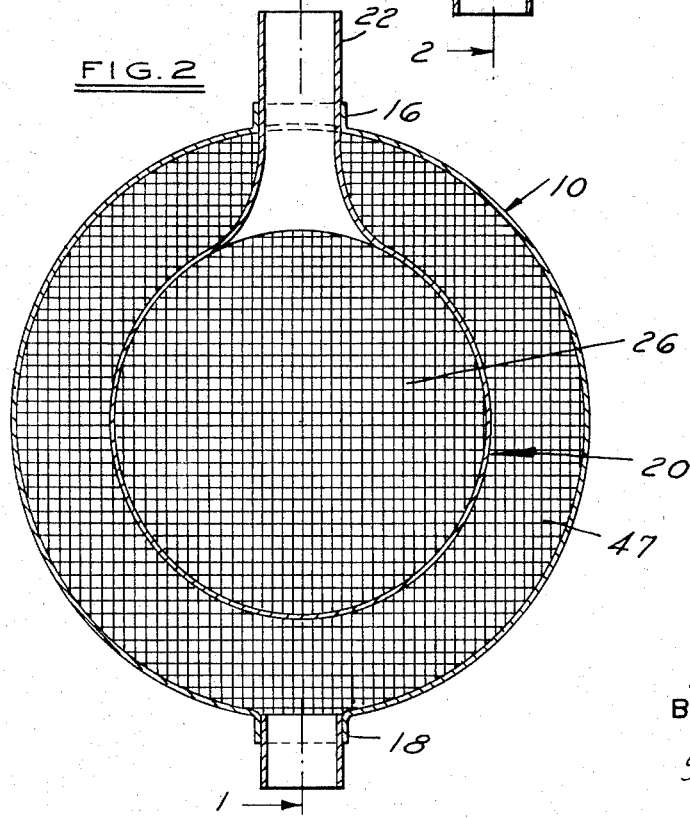
FIG. 2 is a sectional view taken radially through the converter along line 2—2 of FIG. 1 to show the toroidal construction of the oxidizing catalyst beds and the relationship thereof to the centrally located, cylindrical beds of reducing catalyst.

Referring to the drawings, the catalytic converter comprises a cylindrical outer housing 10 closed by side walls 12 and 13. Side walls 12 and 13 curve outwardly or balloon at the radial extremities as designated by numerals 14 and 15. An inlet opening 16 is located in the approximate center of the cylindrical portion of outer housing 10 and an outlet 18 is located in the cylindrical portion diametrically opposite inlet opening 16.

A cylindrical inner housing 20 is located centrally within outer housing 10. An inlet tube 22 connects with the interior of inner housing 20 and extends through inlet opening 16 of outer housing 10. Side walls 24 and 26 of inner housing 20 are porous to gas flow and can be made of wire screen, expanded metal, or other suitable materials. Cylindrical flanges 28 and 30 extend axially outward from the respective sides of inner housing 20 so the flanges surround respective side walls 24 and 26.

Flanges 28 and 30 terminate a short distance away from side walls 12 and 13 of the outer housing and radially outward of the inner ends of balloon sections 14 and 15. Circular plates 32 and 34 that are porous to exhaust gas flow extend across the ends of respective flanges 28 and 30 and terminate against the cylindrical portion of outer housing 10. Plates 32 and 34 are spaced a short distance inward from respective side walls 12 and 13 of the outer housing to define narrow gas flow spaces 36 and 38 therewith. Expanded metal, wire screen, or similar materials can be used to make plates 32 and 34.

A disc-shaped bed 40 of reducing catalyst is positioned on the left side of inner housing 20 where the catalyst bed is retained axially by side wall 24 and plate 32, and radially by flange 28. Similarly, a disc-shaped bed 42 of reducing catalyst is located on the right side of inner housing 20 where it is retained axially by side wall 26 and plate 34 and radially by flange 30.

Radially outward of flange 28 is a toroidally-shaped bed 44 of an oxidizing catalyst. Bed 44 is retained radially by flange 28 and a cylindrical portion of outer housing 10. Porous plate 32 defines the axially outer face of bed 44 and an annular porous plate 45 positioned in the plane of side wall 24 defines its axially inner face. Similarly, flange 30 defines the radially inner surface of a second toroidally-shaped bed 46 of the oxidizing catalyst that is defined axially by porous plate 34 and an annular porous plate 47.

A plate 48 is positioned adjacent the exterior of the flat portion of side wall 12 to define an air space 49 therewith. Similarly, a plate 50 is positioned adjacent the exterior of the flat portion of side wall 13 to define an air space 51 therewith. Plates 48 and 50 form air tight seals where the plates intersect respective balloon portions 14 and 15. A tube 52 connects with the center portion of plate 48 and a similar tube 53 connects with the center portion of plate 50. Tubes 52 and 53 are brought together in a Y section 54 that is supplied with air by an engine driven air pump (not shown).

A plurality of small openings 56 are formed in balloon portions 14 and 15 at the approximate radial level of flanges 28 and 30 to connect air spaces 49 and 51 with respective gas flow spaces 36 and 38. The axes of openings 56 preferably are substantially parallel to the radii of the flat portions of end walls 12 and 13, but can turn inwardly to a considerable extent if desired. Forming the openings is simplified when the openings are perpendicular to balloon portions 14 and 15 and satisfactory results are obtained thereby.

Converter operation occurs in the following manner. Hot exhaust gases from the engine enter the converter through inlet pipe 22 and are distributed across the facial area of reducing catalysts 40 and 42 by inner housing 20. The exhaust gases flow axially outward through reducing beds 40 and 42 where any oxides of nitrogen are reduced to less harmful components. Gases exiting from the reducing beds flow radially outward in spaces 36 and 38.

As the gases pass the edges of flanges 28 and 30, they mix with supplemental air supplied through holes 56. The secondary air has a flow component parallel to the gases when it enters spaces 36 and 38, which prevents any backflow of either the air or the gases and promotes smooth, uniform mixing. The mixture passes axially through oxidizing beds 44 and 46 where the supplemental air is used in oxidizing unburned hydrocarbons or carbon monoxide to less harmful components. The treated gases exit from beds 44 and 46 into the toroidial space defined by housings 10 and 20 and plates 45 and 47 and finally flow out of exit opening 18.

The central location of reducing beds 40 and 42 minimizes conductive heat losses therefrom to insure that the beds are heated rapidly to operating temperature and are maintained at operating temperature. Oxidizing beds 44 and 46 generally operate at slighly lower temperatures although appropriate insulation can be applied to the exterior of outer housing 10 to insure proper operating temperatures if necessary.

Various types of catalysts and catalyst bed constructions can be used in the invention. With structurally integral or monolithic catalyst beds, plates 32, 34, 45 and 47 can be eliminated. Side walls 24 and 26 also might be unnecessary with such catalyst beds, although side walls 24 and 26 assist in distributing the exhaust gases across the facial area of beds 40 and 42 and might be retained for this purpose. Bed 42 can contain a different catalyst than bed 40 and bed 46 can contain a different catalyst than bed 44. Additionally, all four beds can perform the same oxidizing or reducing function on different components of the exhaust gas stream. Some or all of the supplemental air can be supplied to the exhaust gases entering tube 22, but the resulting dilution decreases the efficiency of the reducing beds.

Thus this invention provides a catalytic converter that contains multiple catalyst beds in a unitary, compact, easily constructed housing. The converter has plural gas flow paths so that clogging or malfunction on one path does not disable the entire operation.

We claim:

1. A multiple bed catalytic converter for performing catalytic conversion of components of exhaust gases comprising
an outer housing having an exhaust gas outlet, said outer housing being enclosed by at least one end wall,
a distributing housing located in the central portion of said outer housing and connected to an exhaust gas inlet,
a first catalyst bed located adjacent said distributing housing, said first catalyst extending toward said outer housing but being separated therefrom by a narrow space,
a second catalyst bed connecting said narrow space with said exhaust gas outlet, and
air supply means communicating with said narrow space for supplying air to the exhaust gases entering said second catalyst, said air supply means comprising a plate located adjacent said end wall to define a closed air supply chamber passage therewith, said air supply chamber communicating with said narrow space through a plurality of openings in said chamber, and an air inlet means for supplying air to said chamber.

2. The converter of claim 1 in which the first catalyst is a reducing catalyst for reducing oxides of nitrogen.

3. The converter of claim 1 in which the second catalyst is an oxidizing catalyst for oxidizing other components of the exhaust gases.

4. The converter of claim 1 in which the outer housing is substantially cylindrical and said outer housing is enclosed by at least two of said end walls.

5. The converter of claim 4 in which the air supply means comprises a plate located adjacent each end wall of the outer housing to define a closed air supply chamber therewith, said end walls of the outer housing containing said plurality of openings connecting said air supply chambers with said narrow space.

6. The converter of claim 5 in which each end wall of the outer housing has an outwardly curved portion at its radial extremity outside of a flat portion and each of said plates is adjacent the flat portion, said plates intersecting the inner surfaces of the curved portions and said openings being located in the curved portions.

7. The converter of claim 6 in which the axes of said openings are substantially parallel to the radii of the end walls of the outer housing and the openings are approximately adjacent the radial positions of said flanges.

8. The converter of claim 4 in which the distributing housing is substantially cylindrical and comprising projecting flanges attached to each side of said distributing housing, said flanges terminating a short distance from each respective end wall of the outer housing, said first catalyst comprising a disc shaped catalyst bed positioned axially inside of each of said flanges on each side of said distributing housing, each of said beds being separated from the end walls of the outer housing by said narrow space.

9. The converter of claim 8 in which the second catalyst comprises a toroidal catalyst bed positioned axially outside of each of said flanges so the gases exiting from the first catalyst bed flow through said narrow space to the second catalyst bed.

10. The converter of claim 9 in which the first catalyst is a reducing catalyst for reducing oxides of nitrogen.

11. The converter of claim 10 in which the second catalyst is an oxidizing catalyst for oxidizing other components of the exhaust gases.

12. The converter of claim 11 in which the air supply means comprises a plate located adjacent each end wall of the outer housing to define a closed air supply chamber therewith, said end walls of the outer housing containing said plurality of openings connecting said air supply chambers with said narrow space.

13. The converter of claim 12 in which each end wall of the outer housing has an outwardly curved portion at its radial extremity outside of a flat portion and each of said plates is adjacent the flat portion, said plates intersecting the inner surfaces of the curved portions and said openings being located in the curved portions.

14. The converter of claim 13 in which the axes of said openings are substantially parallel to the radii of the end walls of the outer housing and the openings are approximately adjacent the radial positions of said flanges.

References Cited
UNITED STATES PATENTS

| 1,902,160 | 3/1933 | Frazer et al. | 23—2 E |
| 3,228,746 | 1/1966 | Howk et al. | 23—2 E |
| 3,544,264 | 12/1970 | Hardison | 23—2 E |

BARRY S. RICHMAN, Primary Examiner

U.S. Cl. X.R.
60—301; 423—213